United States Patent
Zhang et al.

(10) Patent No.: US 12,138,580 B2
(45) Date of Patent: Nov. 12, 2024

(54) PYROLYSIS VAPOR OUTLET ANTI-COKING DEVICE AND METHOD OF ADSORBING MEDIUM SELF-RECYCLING REGENERATION

(71) Applicant: SOUTHEAST UNIVERSITY, Nanjing (CN)

(72) Inventors: Huiyan Zhang, Nanjing (CN); Bo Peng, Nanjing (CN); Siyu Wang, Nanjing (CN); Rui Xiao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/703,716

(22) PCT Filed: Nov. 22, 2022

(86) PCT No.: PCT/CN2022/133370
§ 371 (c)(1),
(2) Date: Apr. 23, 2024

(87) PCT Pub. No.: WO2023/226337
PCT Pub. Date: Nov. 30, 2023

(65) Prior Publication Data
US 2024/0325964 A1    Oct. 3, 2024

(30) Foreign Application Priority Data
May 23, 2022  (CN) .......................... 202210559939.6

(51) Int. Cl.
*B01D 53/10* (2006.01)
*B01D 53/12* (2006.01)
(Continued)

(52) U.S. Cl.
CPC .............. *B01D 53/10* (2013.01); *B01D 53/12* (2013.01); *B01D 53/30* (2013.01); *C10G 9/16* (2013.01);
(Continued)

(58) Field of Classification Search
None
See application file for complete search history.

(56) References Cited

U.S. PATENT DOCUMENTS

2014/0017140 A1*  1/2014  Suda ........................ C10K 1/26
                                                                   422/187
2017/0107431 A1    4/2017  Jemmett et al.

FOREIGN PATENT DOCUMENTS

CN          1626626 A       6/2005
CN        201850253 U       6/2011
(Continued)

OTHER PUBLICATIONS

JP2011037933A_ENG (Expacenet machine translation of Murakami) (Year: 2011).*
(Continued)

*Primary Examiner* — Youngsul Jeong
(74) *Attorney, Agent, or Firm* — Bayramoglu Law Offices LLC

(57) ABSTRACT

A pyrolysis vapor outlet anti-coking device of adsorbing medium self-recycling regeneration includes a particle flow adsorbing system and a medium burning regeneration recycling system in mutual communication. The particle flow adsorbing system is configured to enable an easy-to-coke component to be adsorbed on an outer surface of an adsorbing medium to form a coking layer, and convey the a coking adsorbing medium into the medium burning regeneration recycling system. The medium burning regeneration recycling system is configured to quickly burn the coking layer (Continued)

on the outer surface of the adsorbing medium to realize regeneration of the adsorbing medium and convey the regenerated adsorbing medium into the particle flow adsorbing system for recycling use.

11 Claims, 1 Drawing Sheet

(51) Int. Cl.
  *B01D 53/30* (2006.01)
  *C10G 9/16* (2006.01)
(52) U.S. Cl.
  CPC .. *B01D 2253/104* (2013.01); *B01D 2253/106* (2013.01); *B01D 2258/0283* (2013.01); *B01D 2259/4009* (2013.01)

(56) References Cited

FOREIGN PATENT DOCUMENTS

| | | | |
|---|---|---|---|
| CN | 102977912 | A | 3/2013 |
| CN | 207996670 | U | 10/2018 |
| CN | 112680243 | A | 4/2021 |
| CN | 213570326 | U | 6/2021 |
| CN | 113150841 | A * | 7/2021 |
| CN | 114940917 | A | 8/2022 |
| JP | 2011037933 | A * | 2/2011 |
| JP | 2011105892 | A | 6/2011 |

OTHER PUBLICATIONS

CN113150841A_ENG (Expacenet machine translation of Li) (Year: 2021).*

* cited by examiner

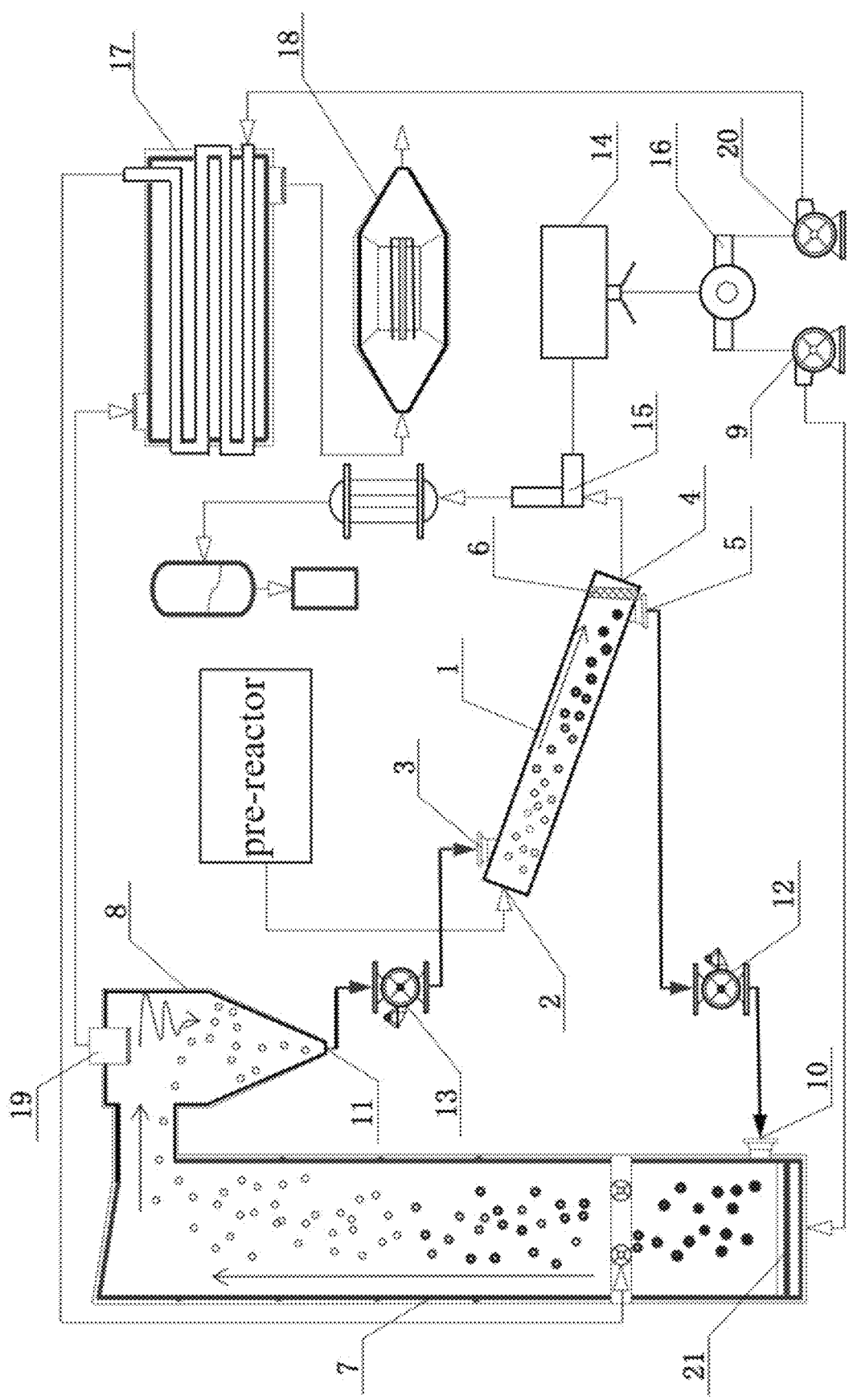

PYROLYSIS VAPOR OUTLET ANTI-COKING DEVICE AND METHOD OF ADSORBING MEDIUM SELF-RECYCLING REGENERATION

CROSS REFERENCE TO THE RELATED APPLICATIONS

This application is the national phase entry of International Application No. PCT/CN2022/133370, filed on Nov. 22, 2022, which is based upon and claims priority to Chinese Patent Application No. 202210559939.6, filed on May 23, 2022, the entire contents of which are incorporated herein by reference.

TECHNICAL FIELD

The present disclosure relates to the technical field of energy chemical equipment and in particular to a pyrolysis vapor outlet anti-coking device and method of adsorbing medium self-recycling regeneration.

BACKGROUND

In the thermal equipment such as pyrolysis furnace in the energy chemical field, hot pyrolysis vapor can still continue secondary reaction to generate coke or heavy components are condensed on a surface of the equipment at a relatively low temperature, causing physical adhesion and complex chemical reactions and finally forming solid coke. Due to these reasons, several structures of the equipment suffer severe coking problems, which usually cause unplanned shutdown maintenance and sometimes even cause severe production accidents. At present, in the actual productions, these coking problems are mostly solved by fine operations or regular disassembling maintenance, bringing severe hindrance to large-scale continuous production, and affecting the economic benefits. Therefore, the anti-coking technology plays a critical role in the energy chemical field.

The current anti-coking technology is mainly focused on prevention and reduction of coking phenomena of heated surfaces. But, in the outlet pipes, the particles of the pyrolysis vapor adhere to the walls of the pyrolysis vapor pipes, and thus secondary reaction occurs to the high-temperature pyrolysis vapor so as to generate coke, causing similar severe coking in the pyrolysis vapor outlet pipes. There is no effective treatment method for the coking problems with the pyrolysis vapor outlets and pipes. Usually, a common method is to inject or spray a quench oil medium to the outlet pipes to enable the high-temperature pyrolysis vapor to be in contact with the injected quench oil medium and mixed with it and thus reduce the pyrolysis vapor temperature to below the secondary reaction temperature, mitigating the coking phenomenon. For example, the patent CN201020608643.1 discloses a device capable of removing coke from a pyrolysis vapor outlet pipe online, in which tar is removed by using a cross rod with a three-way part. The patent CN202022343856.2 discloses an anti-coking device of a pyrolysis vapor outlet pipe of a coke tower, where a quench oil is sprayed into the pyrolysis vapor pipe to quickly reduce a temperature of the high-temperature pyrolysis vapor and terminate a secondary reaction of the pyrolysis vapor, preventing coking. In such technologies, different coking mechanisms cannot be considered. The wall-surface heating technology usually brings higher energy consumption whereas quenching technologies have poor adaptability to the thermal equipment of different types as well as low efficiency and poor stable continuity. Therefore, the problems of long-period operation and the like cannot be addressed. As a result, it is significant to develop an anti-coking device with broad application, efficiency energy saving, high automation level, good continuity and good ability to run for long stably and continuously.

SUMMARY

In order to solve the pyrolysis vapor coking problem, the present disclosure provides a pyrolysis vapor outlet anti-coking device and method of adsorbing medium self-recycling regeneration.

In order to address the above problem, the present disclosure employs the following technical solution.

A pyrolysis vapor outlet anti-coking device of adsorbing medium self-recycling regeneration, comprising a particle flow adsorbing system and a medium burning regeneration recycling system in mutual communication; the particle flow adsorbing system is configured to enable an easy-to-coke component to be adsorbed on an outer surface of an adsorbing medium to form a coking layer, and convey the coking adsorbing medium into the medium burning regeneration recycling system; the medium burning regeneration recycling system is configured to quickly burn the coking layer on the outer surface of the adsorbing medium to realize regeneration of the adsorbing medium and convey the regenerated adsorbing medium into the particle flow adsorbing system for recycling use.

Furthermore, the particle flow adsorbing system comprises a pyrolysis vapor pipe, one end of the pyrolysis vapor pipe is provided with a pyrolysis vapor inlet and a medium recycling inlet, the other end of the pyrolysis vapor pipe is provided with a pyrolysis vapor outlet and a medium recycling outlet, and a blocking net is disposed between the pyrolysis vapor outlet and the medium recycling outlet in the pyrolysis vapor pipe; the medium burning regeneration recycling system comprises a fluidized burning furnace, a gas-solid separator and a first blower, the medium recycling outlet of the pyrolysis vapor pipe is connected with a medium inlet of the fluidized burning furnace, an outlet of the fluidized burning furnace is connected with an inlet of the gas-solid separator, a medium outlet of the gas-solid separator is connected with the medium recycling inlet of the pyrolysis vapor pipe, and an air outlet of the first blower is connected with the fluidized burning furnace.

Furthermore, a first air lock is disposed on a pipe connecting the medium recycling outlet of the pyrolysis vapor pipe with the medium inlet of the fluidized burning furnace, and a second air lock is disposed on a pipe connecting the medium outlet of the gas-solid separator with the medium recycling inlet of the pyrolysis vapor pipe.

Furthermore, the pyrolysis vapor pipe is tilted with a front end high and a rear end low, and an included angle of an axis of the pyrolysis vapor pie and a horizontal plane is 5° to 15°.

Furthermore, the fluidized burning furnace is tilted, such that an included angle of an axis of the fluidized burning furnace and a vertical line is 0° to 20°, and an included angle of a side surface of the medium inlet and a horizontal plane is an acute angle.

Furthermore, further comprising an intelligent control system, wherein the intelligent control system comprises an automatic controller, a pyrolysis vapor flow rate sensor and an air volume regulator, the pyrolysis vapor flow rate sensor is disposed on the pyrolysis vapor outlet of the pyrolysis vapor pipe, the pyrolysis vapor flow rate sensor is connected with an input end of the automatic controller, an output end of the automatic controller is connected with the first blower by the air volume regulator.

Furthermore, further comprising a tail gas heat supply treatment system, wherein the tail gas heat supply treatment system comprises a heat exchange unit and a tail gas treatment device, a tail gas outlet is disposed on the top of the gas-solid separator, and the tail gas outlet is connected with the tail gas treatment device by the heat exchange unit.

Furthermore, further comprising a second blower, wherein an air outlet of the second blower passes through the heat exchange unit and then connects with a sidewall of the fluidized burning furnace, and the output end of the automatic controller is connected with the second blower by the air volume regulator.

A pyrolysis vapor outlet anti-coking method of adsorbing medium self-recycling regeneration, comprising the following steps:

at step S1, an adsorbing medium and a pyrolysis vapor generated by a pre-reactor enter a front end of the pyrolysis vapor pipe and are fully mixed and fluidized to form a particle fluid and convey the particle fluid forward, macromolecular heavy components in the pyrolysis vapor are formed into a coking layer around an adsorbing medium, and the coking adsorbing medium is separated from the gas phase at the blocking net at the tail of the pyrolysis vapor pipe (1), and enters the fluidized burning furnace;

at step S2, the coking layer around the coking adsorbing medium is burned and consumed inside the fluidized burning furnace to regenerate the adsorbing medium, and the regenerated adsorbing medium is separated by the gas-solid separator and then enters the pyrolysis vapor pipe for recycling use.

Furthermore, the automatic controller monitors a pyrolysis vapor flow rate by the pyrolysis vapor flow rate sensor, and regulates an adsorption and regeneration recycling rate of the adsorbing medium by the first blower and the second blower.

Furthermore, an air volume of the second blower takes 30% to 50% of a total air volume, an excess air coefficient is 1.2 to 1.5, and a burning temperature inside the fluidized burning furnace is 900° C. to 1300° C. and a burning pressure is a normal pressure.

Furthermore, a tail gas generated by the burning of the fluidized burning furnace enters the heat exchange unit for heat exchange and then undergoes tail gas treatment while the exchanged heat is conveyed into the fluidized burning furnace by the second blower.

Furthermore, the adsorbing medium is a high-temperature-resistant spherical material, and may be one or more of quartz ball, aluminum oxide ceramic ball, and silicon carbide ceramic ball.

The above technical solutions have the following beneficial effects.

The device of the present disclosure can be set flexibly based on the pyrolysis vapor pipe of the pre-reactor and thus have broad applications. The device can be directly used on the existing thermal equipment without being changed significantly.

In the device of the present disclosure, the adsorbing medium can realize automatic adsorption and regeneration and recycling without frequently disassembling the pipe for coke removal, ensuring long-term continuous operation of the thermal equipment.

The device of the present disclosure enhances energy conversion and recycling by the heat exchange unit so as to increase the energy utilization efficiency and improve the energy efficiency of the device, achieving energy saving.

The device of the present disclosure uses the intelligent control system to automatically perform intelligent optimization and adjustment to the air volume ratio based on the adsorbing medium recycling amount required by different responsive working conditions, achieving the connection of the systems and ensuring stable and efficient combustion.

BRIEF DESCRIPTIONS OF THE DRAWINGS

FIGURE is a schematic diagram of a structure of the present disclosure.

Numerals of the drawings are described below: 1. pyrolysis vapor pipe, 2. pyrolysis vapor inlet, 3. medium recycling inlet, 4. pyrolysis vapor outlet, 5. medium recycling outlet, 6. blocking net, 7. fluidized burning furnace, 8. gas-solid separator, 9. first blower, 10. medium inlet, 11. medium outlet, 12. first air lock, 13. second air lock, 14. automatic controller, 15. pyrolysis vapor flow rate sensor, 16. air volume regulator, 17. heat exchange unit, 18. tail gas treatment device, 19. tail gas outlet, 20. second blower, 21. air distribution plate.

DETAILED DESCRIPTIONS OF THE EMBODIMENTS

The implementations of the present disclosure will be further detailed below in combination with drawings and specific embodiments. The following embodiments are used to illustrate the present disclosure rather than limit the scope of the present disclosure.

As shown in FIGURE, it is a schematic diagram of an embodiment of the present disclosure.

Embodiment 1

There is provided a pyrolysis vapor outlet anti-coking device of adsorbing medium self-recycling regeneration, including a particle flow adsorbing system and a medium burning regeneration recycling system in mutual communication; wherein, the particle flow adsorbing system is configured to enable an easy-to-coke component to be adsorbed on an outer surface of an adsorbing medium to form a coking layer, and convey the coking adsorbing medium into the medium burning regeneration recycling system; namely, the easy-to-coke pyrolysis vapor and the adsorbing medium are conveyed together into the particle flow adsorbing system and fully mixed and fluidized, and the easy-to-coke component is adsorbed around the adsorbing medium to prevent the component from being coked on the pyrolysis vapor outlet or transport pipe;

the medium burning regeneration recycling system is configured to quickly burn the coking layer on the outer surface of the adsorbing medium to realize regeneration of the adsorbing medium and convey the regenerated adsorbing medium into the particle flow adsorbing system for recycling use.

In a specific technical solution, the particle flow adsorbing system includes a pyrolysis vapor pipe 1, wherein one end of the pyrolysis vapor pipe 1 is provided with a pyrolysis vapor inlet 2 and a medium recycling inlet 3, the other end of the pyrolysis vapor pipe 1 is provided with a pyrolysis vapor outlet 4 and a medium recycling outlet 5, and a blocking net 6 is disposed between the pyrolysis vapor outlet 4 and the medium recycling outlet 5 in the pyrolysis vapor pipe 1. The pyrolysis vapor generated by a pre-reactor enters the pyrolysis vapor inlet 2 and the adsorbing medium enters the medium recycling inlet 3 and thus both of them can be fully mixed and fluidized to form a particle fluid and convey it forward and then gas-solid separation of the particle flow is achieved by using the flow rate at the blocking net, and then the coking adsorbing medium completing adsorption is filtered away from the pyrolysis vapor pipe land sent into the medium burning regeneration recycling system.

The medium burning regeneration recycling system includes a fluidized burning furnace 7, a gas-solid separator 8 and a first blower 9. The medium recycling outlet 5 of the pyrolysis vapor pipe 1 is connected with a medium inlet 10 of the fluidized burning furnace 7. An outlet of the fluidized burning furnace 7 is connected with an inlet of the gas-solid separator 8. A medium outlet 11 of the gas-solid separator 8 is connected with the medium recycling inlet 3 of the pyrolysis vapor pipe 1. An air outlet of the first blower 9 is connected with the bottom of the fluidized burning furnace 7. An air distribution plate 21 is disposed at the bottom of the fluidized burning furnace. The coking adsorbing medium enters the fluidized burning furnace 7 via the medium inlet 10, and a uniform air flow field is formed inside the furnace by the blast of the first blower 9 such that the adsorbing medium is fluidized at high speed and circulated in the system.

A first air lock 12 is disposed on a pipe connecting the medium recycling outlet 5 of the pyrolysis vapor pipe 1 with the medium inlet 10 of the fluidized burning furnace 7, the medium recycling outlet 5 is connected with an inlet end of the first air lock 12, and the medium inlet 10 is connected with an outlet end of the first air lock 12. A second air lock 13 is disposed on a pipe connecting the medium outlet 11 of the gas-solid separator 8 with the medium recycling inlet 3 of the pyrolysis vapor pipe 1, the medium outlet 11 is connected with an inlet end of the second air lock 13, the medium recycling inlet 3 is connected with an outlet end of the second air lock 13. The disposal of the air locks can ensure stable recycling of the system and prevent unstable inner pressure difference in the system and the reverse flow of the gas.

Furthermore, the pyrolysis vapor pipe 1 is tilted with a front end high and a rear end low. The pyrolysis vapor and the adsorbing medium enter the high end and leave from the low end. An included angle of an axis of the pyrolysis vapor pipe 1 and a horizontal plane is 5° to 15°. The tilted disposal of the pyrolysis vapor pipe 1 helps the flowing and filtering of the adsorbing medium under the action of the deadweight of the adsorbing medium, avoiding the settling of the adsorbing medium.

Furthermore, the fluidized burning furnace 7 is tilted, such that an included angle of an axis of the fluidized burning furnace 7 and a vertical line is 0° to 20°, and an included angle of a side surface of the medium inlet 10 and a horizontal plane is an acute angle. Thus, the fluidized burning furnace is tilted rightward to help medium transportation and form an appropriate flow field during burning regeneration.

Furthermore, the pyrolysis vapor in the pyrolysis vapor pipe 1 comes from volatile pyrolysis vapor components generated by the conversion reactions such as pyrolysis and gasification and the like of one or more of raw materials such as coal, biomass and solid waste and the like in the pre-reactor. The adsorbed pyrolysis vapor enters a post-device of condensation and absorption type.

Furthermore, the gas-solid separator 8 may be disposed as one of a centrifugal cyclone separator, a settling separator, a spiral channel type separator and a gravity separator and the like to achieve quick separation of the regenerated adsorbing medium from the burning flue gas.

Embodiment 2

This embodiment differs from the above embodiment 1 in that it further includes an intelligent control system. The intelligent control system includes an automatic controller 14, a pyrolysis vapor flow rate sensor 15 and an air volume regulator 16. The pyrolysis vapor flow rate sensor 15 is disposed on the pyrolysis vapor outlet 4 of the pyrolysis vapor pipe 1 to monitor a flow rate of the pyrolysis vapor pipe. The pyrolysis vapor flow rate sensor 15 is connected with an input end of the automatic controller 14, and an output end of the automatic controller 14 is connected with the first blower 9 by the air volume regulator 16. The automatic controller may be a monitoring computer in a large thermal system including the pre-reactor to monitor the coking. A computer program can, based on an intelligent algorithm (the algorithm may be controlled by the common genetic algorithm-based PID), automatically match a flow rate of the adsorbing medium, and based on the flow rate of the adsorbing medium, match a fluidizing rate and thus automatically regulate the air volume of the blower by the regulator 16.

Embodiment 3

This embodiment differs from the above embodiment 1 or 2 in that it further includes a tail gas heat supply treatment system. The tail gas heat supply treatment system includes a heat exchange unit 17 and a tail gas treatment device 18. A tail gas outlet 19 is disposed on the top of the gas-solid separator 8, and the tail gas outlet 19 is connected with the tail gas treatment device 18 by the heat exchange unit 17.

Furthermore, this embodiment further includes a second blower 20. An air outlet of the second blower 19 passes through the heat exchange unit 17 and then connects with a sidewall of the fluidized burning furnace 7, and the output end of the automatic controller 14 is connected with the second blower 19 by the air volume regulator 16. The air volume regulator 16 is a device capable of controlling the air volumes of the two blowers respectively by using independent valves of the two blowers integrated into one master control line. The air outlet of the second blower 20 is disposed by surrounding the wall of the furnace at a height between the medium inlet 10 and the medium outlet 11, and usually, 1 to 4 air outlets are disposed. The disposal of several air outlets can help optimize secondary air distribution ratio and stabilize efficient burning atmosphere.

Furthermore, the heat exchange unit 17 may be further connected with a system heat supply module, for example, may be connected with a material feed device to dry materials, with a feed-in pre-reactor to provide heat to the reactions and with a preheater to preheat the combustion-desired air and/or the like. The heat exchange unit 17 can improve the energy efficiency of the device system and increase the energy utilization efficiency.

Furthermore, the tail gas treatment device 18 may be disposed as adsorbing device, purifying device, or plasma treatment device or the like to ensure clean discharge of the device system.

There is provided a pyrolysis vapor outlet anti-coking method of adsorbing medium self-recycling regeneration, which includes the following steps:

In the particle flow adsorbing system, the regenerated aluminum oxide ceramic balls enter the front end of the pyrolysis vapor pipe 1 through the medium recycling inlet 3 and is fully mixed and fluidized with the pyrolysis vapor generated in the pre-reactor to form a particle fluid and convey it forward; the macromolecular heavy components in the pyrolysis vapor are formed into a coking layer around the aluminum oxide ceramic balls; the coked aluminum oxide ceramic balls are separated from the gas at the blocking net 6 at the tail of the pyrolysis vapor pipe 1, and then leave the pyrolysis vapor pipe 1 through the first air lock 12 from the medium recycling outlet 5 and enter the fluidized burning furnace 7; oil product is collected by passing the adsorbed pyrolysis vapor through the condensation and pyrolysis vapor separation device.

In the medium burning regeneration recycling system, the coked aluminum oxide ceramic balls are fluidized in the high-speed air current blown by the first blower 9; the second blower 20 supplies high-temperature air, and the combustible coking layer around the aluminum oxide ceramic balls goes through combustion reaction for consumption in the high-temperature air of the burning furnace and thus the aluminum oxide ceramic balls can be regenerated; the regenerated aluminum oxide ceramic balls leave the fluidized burning furnace 7 through the second air lock 13 from the medium outlet 11 and enter the pyrolysis vapor pipe 1 for recycling.

In the intelligent control system, the automatic controller 14 monitors the pyrolysis vapor flow rate by the pyrolysis vapor flow rate sensor 15 to complete automatic matching of the air volume and the pyrolysis vapor flow rate, and then the blast amount of the first blower 9 and the second blower 20 is automatically regulated by the air volume regulator 16. The recycling speed of the aluminum oxide ceramic balls in the system is regulated by the blast amount of the first blower 9.

In the tail gas heat supply treatment system, the tail gas generated by the combustion of the fluidized burning furnace 7 leaves the furnace body from the tail gas outlet 19 and enters the heat exchange unit 17 to exchange heat with the secondary air conveyed by the second blower 20 and convey the high-temperature air into the burning furnace so as to form a stable burning environment for burning the coking layer of the aluminum oxide ceramic balls; the heat-exchanged tail gas enters the tail gas treatment device 18 for purification and then is discharged.

Furthermore, an air volume of the second blower 20 takes 30% to 50% of a total air volume, an excess air coefficient is 1.2 to 1.5, a burning temperature inside the fluidized burning furnace 7 is 900° C. to 1300° C. and a burning pressure is a normal pressure.

Furthermore, the adsorbing medium is a high-temperature-resistant spherical material, for example, may be one or more of quartz ball, aluminum oxide ceramic ball, and silicon carbide ceramic ball.

Finally, it should be noted that the above embodiments are used only to illustrate the technical solutions of the present disclosure rather than to limit the present disclosure.

Although the present disclosure is set forth in details by referring to the preceding embodiments, persons of ordinary skill in the arts should understand that they can still make modifications to the technical solutions of the preceding embodiments or make equivalent replacement to partial technical features therein; and these modifications or replacements will not cause the essence of the corresponding technical solutions to depart from the spirit and scope of the technical solutions of the present disclosure.

What is claimed is:

1. A pyrolysis vapor outlet anti-coking device of adsorbing medium self-recycling regeneration, comprising a particle flow adsorbing system and a medium burning regeneration recycling system in mutual communication; wherein
    the particle flow adsorbing system is configured to enable tar to be adsorbed on an outer surface of an adsorbing medium to form a coking layer, and convey a coking adsorbing medium into the medium burning regeneration recycling system;
    the medium burning regeneration recycling system is configured to burn the coking layer on the outer surface of the adsorbing medium to realize regeneration of the adsorbing medium and convey the regenerated adsorbing medium into the particle flow adsorbing system for recycling use;
    the particle flow adsorbing system comprises a pyrolysis vapor pipe, one end of the pyrolysis vapor pipe is provided with a pyrolysis vapor inlet and a medium recycling inlet, the other end of the pyrolysis vapor pipe is provided with a pyrolysis vapor outlet and a medium recycling outlet, and a blocking net is disposed between the pyrolysis vapor outlet and the medium recycling outlet in the pyrolysis vapor pipe; and
    the medium burning regeneration recycling system comprises a fluidized burning furnace, a gas-solid separator and a first blower, the medium recycling outlet of the pyrolysis vapor pipe is connected with a medium inlet of the fluidized burning furnace, an outlet of the fluidized burning furnace is connected with an inlet of the gas-solid separator, a medium outlet of the gas-solid separator is connected with the medium recycling inlet of the pyrolysis vapor pipe, and an air outlet of the first blower is connected with the fluidized burning furnace.

2. The pyrolysis vapor outlet anti-coking device of claim 1, wherein a first air lock is disposed on a pipe connecting the medium recycling outlet of the pyrolysis vapor pipe with the medium inlet of the fluidized burning furnace, and a second air lock is disposed on a pipe connecting the medium outlet of the gas-solid separator with the medium recycling inlet of the pyrolysis vapor pipe.

3. The pyrolysis vapor outlet anti-coking device of claim 1, further comprising an intelligent control system, wherein the intelligent control system comprises an automatic controller, a pyrolysis vapor flow rate sensor and an air volume regulator, the pyrolysis vapor flow rate sensor is disposed on the pyrolysis vapor outlet of the pyrolysis vapor pipe, the pyrolysis vapor flow rate sensor is connected with an input end of the automatic controller, and an output end of the automatic controller is connected with the first blower by the air volume regulator.

4. The pyrolysis vapor outlet anti-coking device of claim 1, further comprising a tail gas heat supply treatment system, wherein the tail gas heat supply treatment system comprises a heat exchange unit and a tail gas treatment device, a tail gas outlet is disposed on a top of the gas-solid separator, and the tail gas outlet is connected with the tail gas treatment device by the heat exchange unit.

5. The pyrolysis vapor outlet anti-coking device of claim 4, further comprising a second blower, wherein an air outlet of the second blower passes through the heat exchange unit and then connects with a sidewall of the fluidized burning furnace, and an output end of an automatic controller is connected with the second blower by an air volume regulator.

6. The pyrolysis vapor outlet anti-coking device of claim 2, further comprising a tail gas heat supply treatment system, wherein the tail gas heat supply treatment system comprises a heat exchange unit and a tail gas treatment device, a tail gas outlet is disposed on a top of the gas-solid separator, and the tail gas outlet is connected with the tail gas treatment device by the heat exchange unit.

7. The pyrolysis vapor outlet anti-coking device of claim 3, further comprising a tail gas heat supply treatment system, wherein the tail gas heat supply treatment system comprises a heat exchange unit and a tail gas treatment device, a tail gas outlet is disposed on a top of the gas-solid separator, and the tail gas outlet is connected with the tail gas treatment device by the heat exchange unit.

8. A pyrolysis vapor outlet anti-coking method of adsorbing medium self-recycling regeneration, comprising the following steps:
   at step S1, an adsorbing medium and a pyrolysis vapor generated by a pre-reactor enter a front end of a pyrolysis vapor pipe and are fully mixed and fluidized to form a particle fluid and convey the particle fluid forward, macromolecular components of the tar in the pyrolysis vapor are formed into a coking layer around an adsorbing medium, and a coking adsorbing medium is separated from a gas phase at a blocking net at a tail of the pyrolysis vapor pipe, and enters a fluidized burning furnace; and
   at step S2, the coking layer around the coking adsorbing medium is burned and consumed inside the fluidized burning furnace to regenerate the adsorbing medium, and the regenerated adsorbing medium is separated by a gas-solid separator and then enters the pyrolysis vapor pipe for recycling use.

9. The pyrolysis vapor outlet anti-coking method of claim 8, wherein an automatic controller monitors a pyrolysis vapor flow rate by a pyrolysis vapor flow rate sensor, and regulates an adsorption and regeneration recycling rate of the adsorbing medium by a first blower and a second blower.

10. The pyrolysis vapor outlet anti-coking method of claim 9, wherein an air volume of the second blower takes 30% to 50% of a total air volume, an excess air coefficient is 1.2 to 1.5, and a burning temperature inside the fluidized burning furnace is 900° C. to 1300° C. and a burning pressure is atmospheric pressure.

11. The pyrolysis vapor outlet anti-coking method of claim 9, wherein a tail gas generated by the burning of the fluidized burning furnace enters a heat exchange unit for heat exchange and then undergoes tail gas treatment while the exchanged heat is conveyed into the fluidized burning furnace by the second blower.

* * * * *